May 1, 1962 M. S. PARKS 3,031,817
ARTICLE WRAPPING MACHINE
Filed Jan. 13, 1959 9 Sheets-Sheet 1

Fig. 1

INVENTOR.
MERWIN S. PARKS
BY
ATTORNEYS

Fig. 2

INVENTOR.
MERWIN S. PARKS
BY
ATTORNEYS

INVENTOR.
MERWIN S. PARKS
ATTORNEYS

INVENTOR.
MERWIN S. PARKS

BY
ATTORNEYS

United States Patent Office 3,031,817
Patented May 1, 1962

3,031,817
ARTICLE WRAPPING MACHINE
Merwin S. Parks, Seattle, Wash., assignor to Wrapmaster Corporation, Seattle, Wash., a corporation of Washington
Filed Jan. 13, 1959, Ser. No. 786,586
20 Claims. (Cl. 53—206)

This invention relates to the art of wrapping, and particularly the wrapping of articles or commodities in a sheet of cellophane or other like or suitable material which admits of being sealed by application of heat. The present invention follows the common practice of first either boxing the commodity or articles or placing same in a cup-like container having a moderately firm bottom. The employed sheet of cellophane is rectangular in shape of such a size that the two diagonals moderately exceed the girth of the package along major axes thereof. The cellophane sheet is centered upon the package with its diagonals coinciding with the related said axes, and as a first step two opposite ends of the sheet are pulled under opposite side edges of the package and tacked one to the other by pressing same momentarily upon an iron or the like heated to a temperature sufficiently high to melt the cellophane. The other two ends are then pulled under the other opposite side edges of the package, lapped one upon the other over the previously tacked ends, and similarly sealed by momentary subjection to the melting heat of the hot iron. The present invention, as its general object, purposes to provide an improved machine which will quickly and effectively perform the described wrapping steps, and which admits of being adjusted with ease and expedition so as to handle packages of different sizes.

Prior to the advent of the present machine, the steps described have been largely performed by hand. Several machines for the purpose of wrapping vari-sized packages have been heretofore devised but the working mechanisms have been quite complicated, requiring that the same be marketed at a high figure, the output from many of these machines has not been appreciably higher than can be accomplished by skilled hand labor, and the machines have been quite bulky so as to require considerable floor area. Food markets and sundry retail sales operations represent perhaps the largest field of use for machine-wrapping of vari-sized packages, and it is in these operations particularly that space is at a premium.

With the above general object in view, and also aiming to provide a machine which can be marketed at a figure quite low by comparison with the price at which previous machines for an analogous purpose have necessarily been sold, one which has an unusually high output, and which requires a modicum of space, the invention consists in the new method by which machine wrapping is performed and in the novel construction and in the adaptation and combination of parts hereinafter described and claimed.

Referring to said drawings, the supporting structure for the machine comprises a cabinet having a generally rectangular plan configuration closed along the front, back and both sides by walls 10, 11, 12 and 13, respectively. The working mechanism of the invention is housed within the cabinet and is so designed that the cabinet is comparatively narrow from front to rear, having its greatest horizontal dimension between the sides. Side portions of the top of the cabinet are covered by two separated panels 14 and 15. A front apron 16 of moderate fore-and-aft width extends along the front edge of the top opening which is provided between said panels 14 and 15, and a rear apron 17 extends along the back edge of said top opening. Both the aprons slope downwardly in a moderate degree from front to back, and are so placed that the upper limit of the latter approximately coincides with the low limit of the former. Said apron 16 performs the function of a feed shelf over which packages to be wrapped are fed by hand onto a supporting surface whereat the wrapping is performed. After being wrapped the package is discharged from the supporting surface onto the apron 17, and it is by these terms "feed" and "discharge" that the aprons will be hereinafter referred to. The supporting surface is composed of two table sections 20 and 21 occupying positions parallel to one another at opposite sides of the longitudinal median line of the machine and extending horizontally from approximately the rear edge of the feed apron to the front edge of the discharge apron. The tables can be adjusted inwardly and outwardly in unison, one in opposition to the other, and the top surfaces thereof, for a purpose which will hereinafter appear, slope downwardly from the inner to the outer edge. Said inner edge occupies a level moderately higher than the front edge of the discharge apron.

Figures 14, 15, 16, 17, 18:
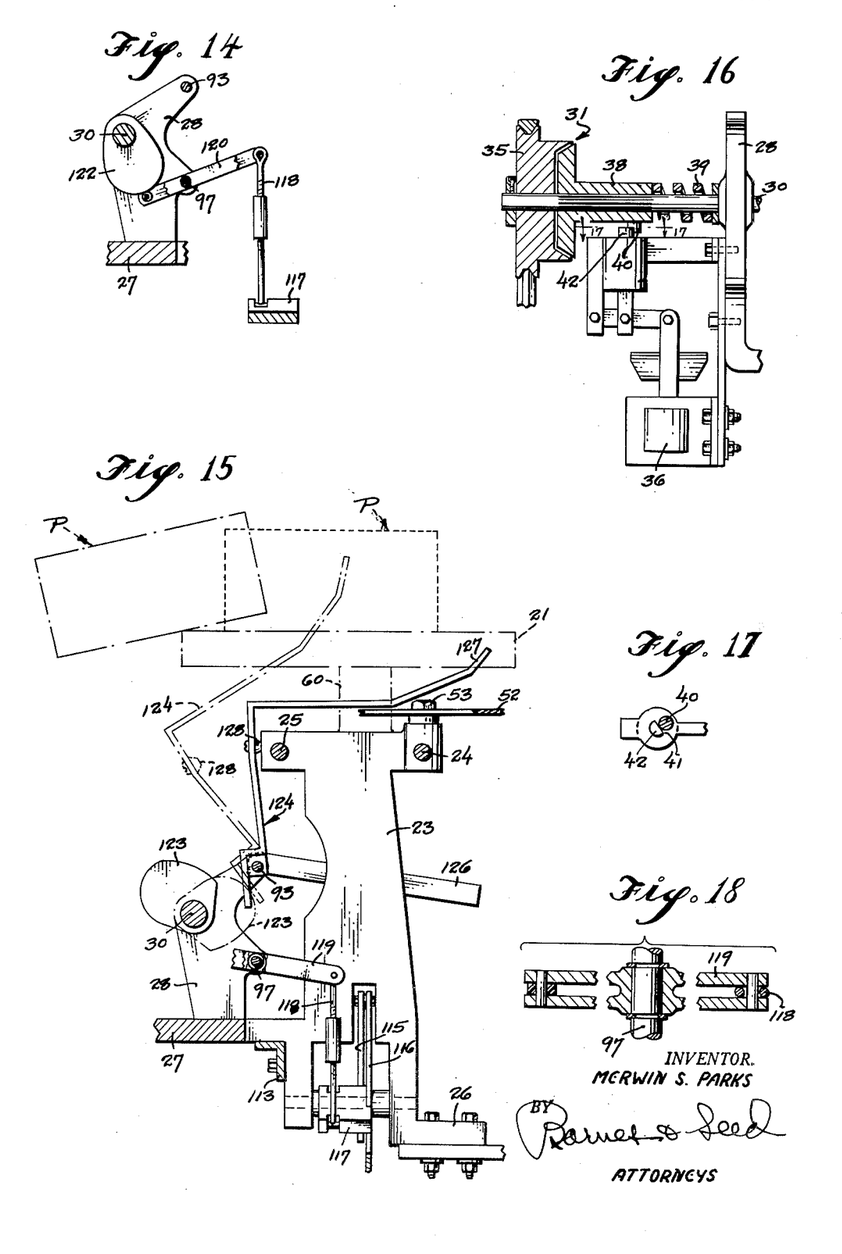
FIG. 14 is a fragmentary longitudinal vertical sectional view on line 14—14 of FIG. 3.
FIG. 15 is a fragmentary longitudinal vertical sectional view on line 15—15 of FIG. 3.
FIG. 16 is an enlarged-scale fragmentary transverse vertical sectional view drawn on a plane occupied by the interruptedly driven shaft responsible for driving a set of five cams which move the working mechanisms of the machine in a wrapping cycle of the latter, the view detailing a solenoid-operated clutch for coupling the shaft at will to a constant drive source of power.
FIG. 17 is a fragmentary horizontal sectional view on line 17—17 of FIG. 16.
FIG. 18 is a fragmentary horizontal sectional view drawn to an enlarged scale on line 18—18 of FIG. 13.
Figure 19:
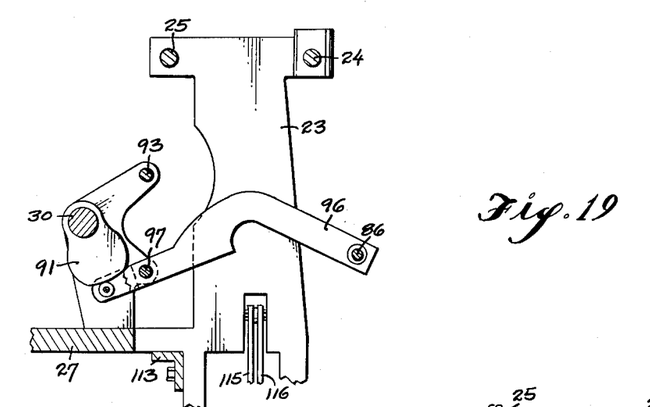
FIG. 19 is a fragmentary longitudinal vertical sectional view on line 19—19 of FIG. 3.

A rigid inner frame work for the machine's working mechanism derives support from the cabinet and is comprised of a stand 23 occupying a position on the machine's longitudinal median line and at the head end having two horizontal bars 24 and 25 fixed by their center portions to the stand so as to each extend laterally from opposite sides thereof one parallel to the other. At its lower end the stand presents feet 26 and 27 bolted or otherwise secured to brackets which are in turn secured to the cabinet. One such foot is surmounted by two laterally spaced uprights 28, and a normally arrested cam shaft 30 is journaled by these uprights for rotation about a transverse horizontal axis. The cam shaft has five cams thereon occupying the space between the two uprights, and associated with the cam shaft for driving the same is a constant-drive electric motor 32. The speed of the motor is reduced by gearing contained in a gear box 33 and by the differential obtaining between driving and driven pulleys 34 and 35. Between such driven pulley and the cam shaft there is provided a normally disengaged clutch 31. The clutch is engaged at will by the momentary closing of a switch (hereinafter to be described) for a normally incomplete electric circuit including a solenoid 36. The function of the solenoid is to release a normally compressed spring 39 responsible for engagement of the clutch. As can be seen from an inspection of FIGS. 16 and 17, a hub 38 for the driven element of the clutch is splined to a projecting end of the cam shaft and presents in its periphery a radial pin 40. Normally interrupted by the bias face 41 of a pin 42 which admits of being depressed into an out-of-the-way position by momentary activation of the solenoid 36, the arrangement is one in which each such activation of the solenoid releases the pin 40 and permits the latter to turn, by responsive spring-activated engagement of the clutch, through a single revolution only. Upon then striking the bias face 41, pin 40 disengages the clutch against the force of the spring. By action of the five cams, in a manner hereinafter to be described, the working mechanism of the machine progresses through a complete cycle of operation upon each said revolution of the cam shaft.

Two mounting heads 50 and 51 are slidably received for transverse adjustment upon said frame bars 24 and 25, one at one side and the other at the other side of the stand 23. A control lever 52 therefor, pivoted intermediate its ends to the stand, as at 53, connects by toggle links 54 with the two heads so as to shift the heads inwardly and outwardly in unison. A handle-forming prolongation of the lever is exposed for manual activation through a horizontal slot underlying the feed apron 16.

Figures 20, 21, 27, 28:
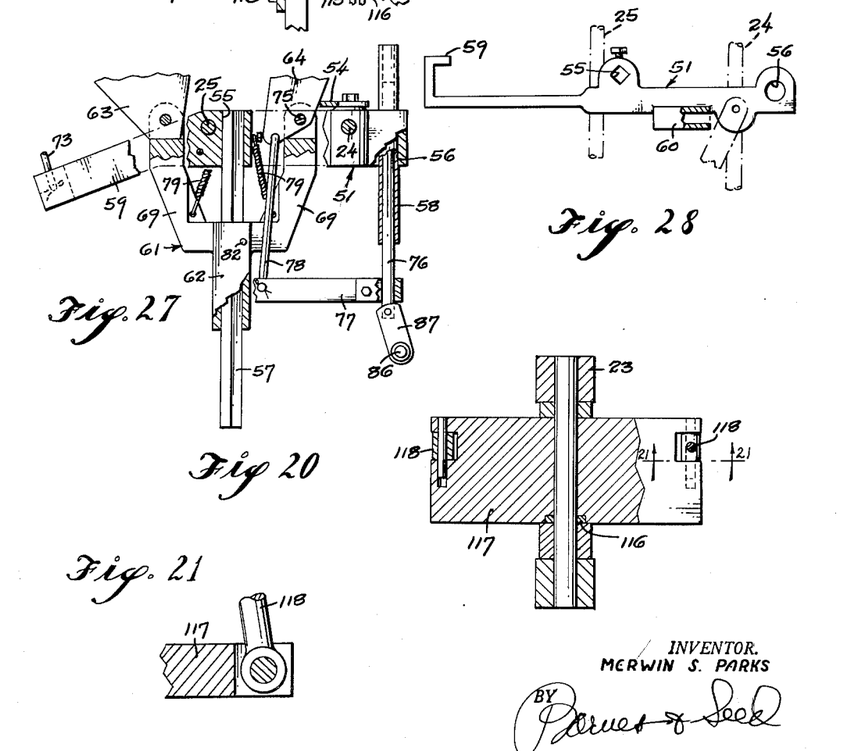
FIG. 20 is a fragmentary enlarged-scale horizontal sectional view on line 20—20 of FIG. 11.
FIG. 21 is a fragmentary sectional view on line 21—21 of FIG. 20.
FIG. 27 is a fragmentary detail view shown partly in side elevation and partly in longitudinal vertical section.
FIG. 28 is a top plan view of one of two heads employed in the machine, disassociated from structure which receives its mounting therefrom.
Figures 22, 23, 24:
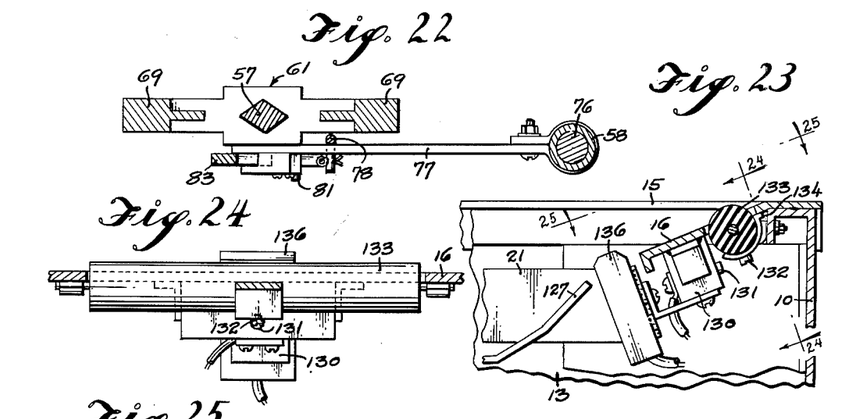
FIG. 22 is a fragmentary enlarged-scale horizontal sectional view on line 22—22 of FIG. 7.
FIG. 23 is an enlarged scale fragmentary longitudinal vertical sectional view taken on the substantial longitudinal median line of the machine to detail a cycle-initiating control switch and an associated cellophane-tacking hot plate. The positions occupied by these parts can be seen from an inspection of FIG. 2.
FIG. 24 is a fragmentary horizontal sectional view on line 24—24 of FIG. 23.

Other than for the fact that the one is a right-hand and the other a left-hand fitting, the two heads are alike and a description of the one, and parts associated therewith, will suffice for the other. As can be best seen from an inspection of FIGS. 26 and 27, the head has two vertical bores 55 and 56 one located intermediate the two frame bars 24 and 25 and the other lying to the front thereof. A rod 57, non-circular in section, has its upper end fixedly secured in the bore 55 so as to depend from the head. A cylindrical pipe 58 is press-fitted or otherwise secured in the other bore 56. Said head 50 or 51, as the case may be, is formed upon its rear end with an inwardly offset toe section 59. An upward extension 60 of the head gives support to the related one of the two table sections 20 and 21.

Figure 7:
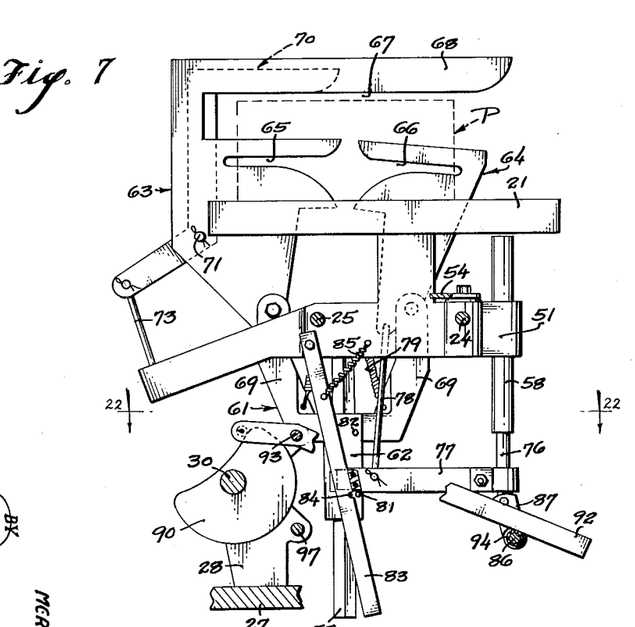
FIGS. 7 and 8 are vertical sectional views showing much the same portion of the machine as is illustrated in FIG. 5 but at two following stages of the machine's cyclic operation.

61 designates an antlered member journaled for vertical slide movement upon said depending portion of the rod 57. The antlers lie to the outside of the head and produce a substantial yoke with the arms 69 thereof lying one to the front and the other to the rear of the slidably journaled hub 62. These yoke-arms present co-planar forks upon the free ends, and a respective hook member is attached by its lower end to each of said forks. The aft hook member is denoted by 63 and its attachment is rigid. The front hook member 64 has a pivotal attachment, provided by a pivot pin 75. Both hook members are stamped from flat plate stock, occupy a common longitudinal vertical plane, and present horizontal slots, as 65 and 66, which are in facing registration when the member 64 is pivoted to the upright position in which it is shown in FIG. 7. Member 63 presents, in addition to the slot 65, a second horizontal slot 67 located above the slot 65 and similarly facing toward the front of the machine. Slot 67 is or may be somewhat deeper than the slot 65 and is defined at the top by a reach arm 68 moderately longer than the combined length of both slots 65 and 66. In addition to pivotal movement of said front member 64, both hook members move bodily with the yoke member 61 as the latter slides reciprocally upon the vertical rod 57. This reciprocal vertical motion moves the hook members from an elevated position whereat the registering slots 65 and 66 occupy a level spaced above the level of the tables 20 and 21 into and out of a depressed position whereat the bottom edge of the reach arm 68 occupies a plane moderately higher than the level occupied by the tables. Lead-in surfaces to each of the slots are bevelled.

Figure 1:
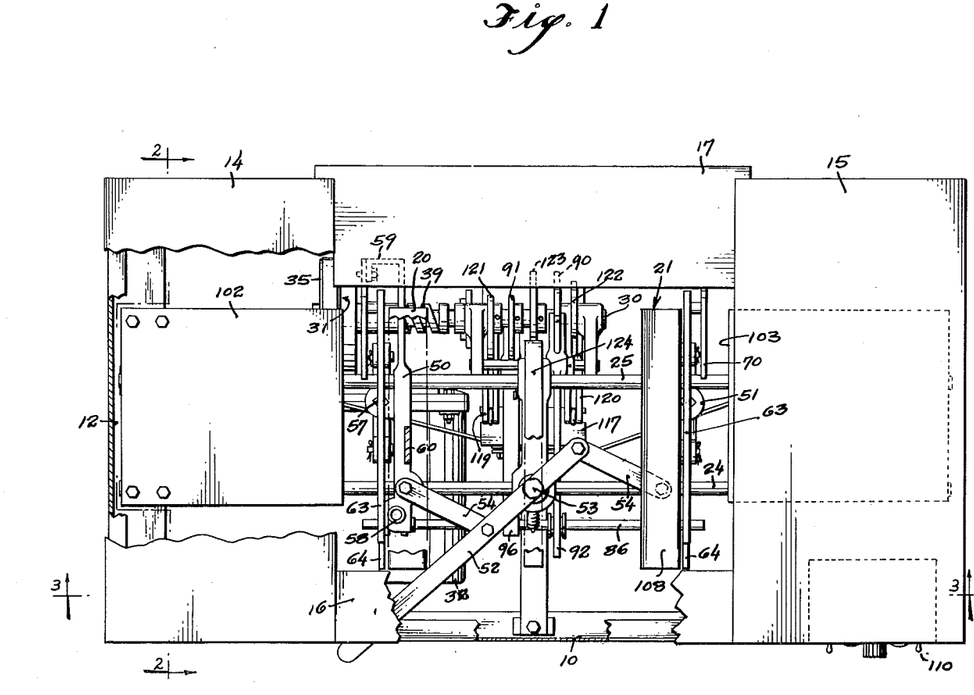
FIGURE 1 is a top view, with portions of one side cover and the feed-in deck broken away, of a machine constructed to embody the preferred teachings of the present invention.
Figure 2:
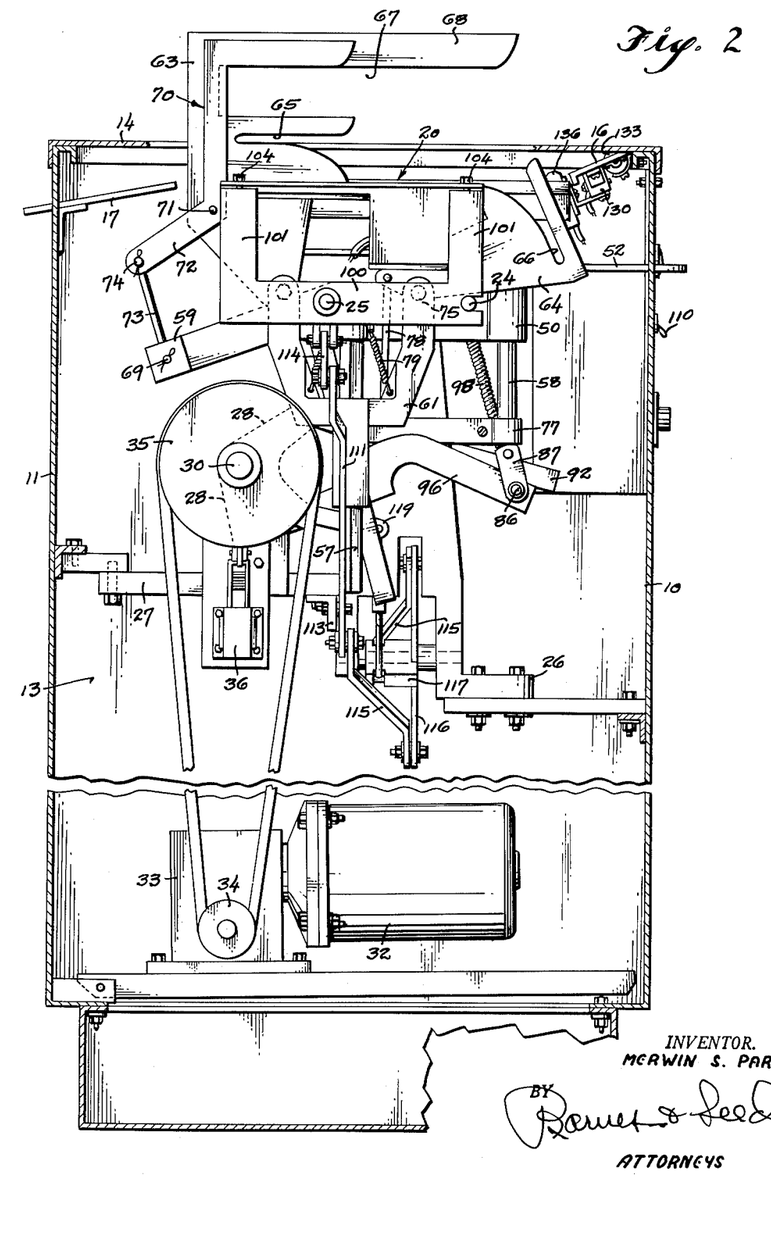
FIG. 2 is a longitudinal vertical sectional view drawn to an enlarged scale on line 2—2 of FIG. 1.
Figure 6:
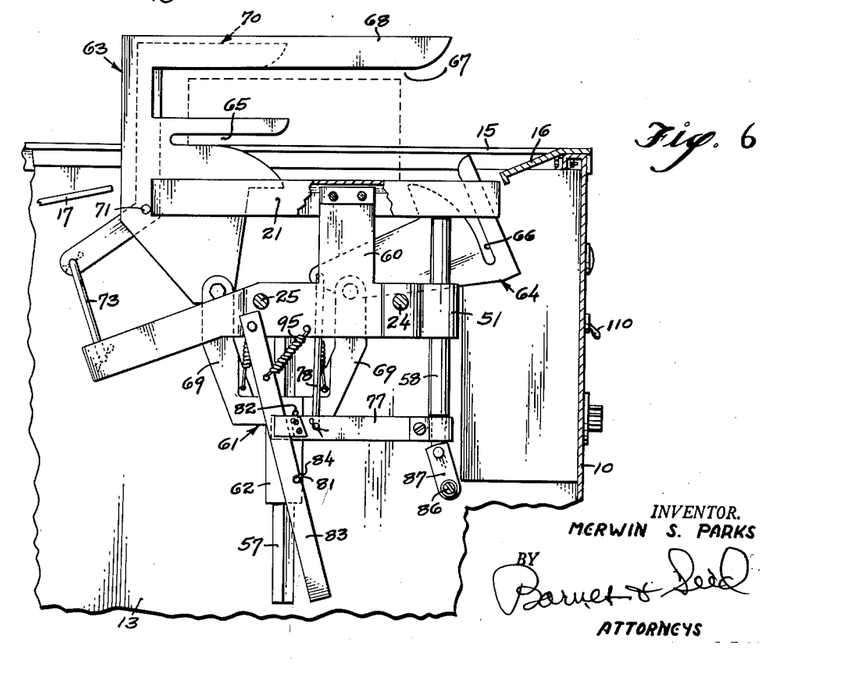
FIG. 6 is a fragmentary longitudinal vertical sectional view drawn to the same scale as FIG. 5 on line 6—6 of FIG. 4.
Figure 10:
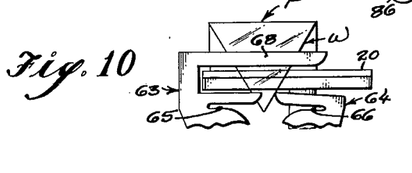

A respective swing arm 70 is provided to occupy an adjacent position alongside the outer face of each of said aft hook members 63. This swing arm is pivoted, as at 71, to a heel portion of the hook member 63, being shaped so as to present a lever arm extending rearwardly from the pivot, and a sweep arm extending upwardly from the pivot. The sweep arm has an angular shape when viewed from the side, and in the normal position in which it is shown in FIGS. 2, 6 and 7, the root section of this angular arm lies to the rear of the slot 67 while the free-end section overlies said slot. The lever arm is denoted by 72 and is activated so as to reciprocally swing the angular arm into and out of the position shown in FIG. 10 by means of a link 73 pivoted, as at 74, to the toe section 59 of the related head 50 or 51.

Figure 9:
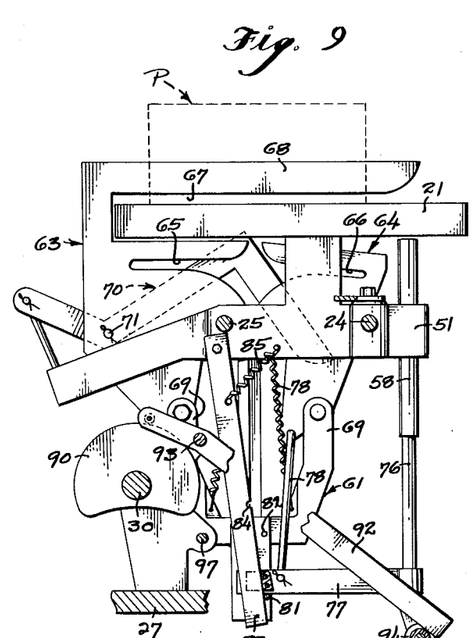
FIGS. 9 and 10 are fragmentary reduced-scale views representing the respective actions upon the cellophane as the machine successively passes through said two illustrated stages of operation.

Each of said pipes 58 serves as the slide journal for a respective guide stem 76, and a respective presser foot 77 is fixedly secured to a protruding lower end of each stem so as to extend rearwardly into a position closely overlying the outer face of a respective one of the two vertically slidable hubs 62. The pressure foot performs two functions. It connects by a link 78 with a toe extension 80 of the related front hook member so as to reciprocally swing the latter from a normal lowered position as shown in FIGS. 2 and 6 into and out of the raised position shown in FIG. 7. It acts by engagement with a pin 81, carried by the related hub 62, to push the hub downwardly, against the yielding restraint imposed by springs 79, from the raised position shown in FIGS. 2 and 7 into the depressed position shown in FIG. 9. Said pin 81 and a second hub-carried pin 82 disposed thereabove prescribe a limited span within which the presser foot may move relative to the hub so as to perform said first function. As a third ancillary function the presser foot acts in the initial stage of its descending motion to disengage the hub from a locking arm 83 which normally localizes the hub. This locking arm presents a notch 84 which is yieldingly urged by a spring 85 into engagement with the bottom pin 81. The presser foot has a terminal fork which straddles the locking arm and upon its descending motion swings the locking arm 83 rearwardly in a degree sufficient to clear the pin 81 momentarily in advance of the engagement of said presser foot with the pin.

The two said presser feet are connected to as to move vertically in unison, by means of a cross-bar 86 underlying the slidably journaled guide stems 76 and connected with the latter by drop-links 87. This cross-bar, for the operation of the presser feet, is activated by two of the five cams hereinbefore mentioned. One such cam, designated by 90, depresses the cross-bar. The other cam 91 raises the cross-bar. Cam 90 presses upwardly upon a lever 92 pivoted intermediate its ends, as at 93, the lever bearing by its outer end upon a flanged roller 94 carried by the cross-bar. A spring 95 holds said lever upon the roller. Cam 91 presses downwardly upon a lever 96 pivoted at 97 and having its outer end pivotally connected to the cross bar. A spring 98 yieldingly tensions the cross-bar against the lever 92.

Figure 11:
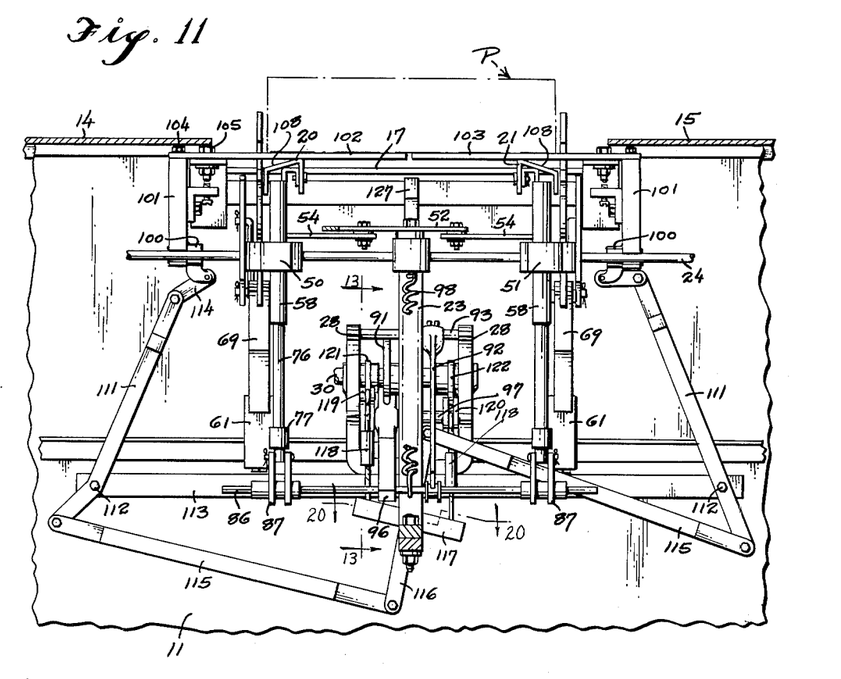
FIG. 11 is a view similar to FIG. 3 with the parts shown in the positions which they occupy when the machine has proceeded to a third stage of the cyclic operation.
Figures 25, 26:
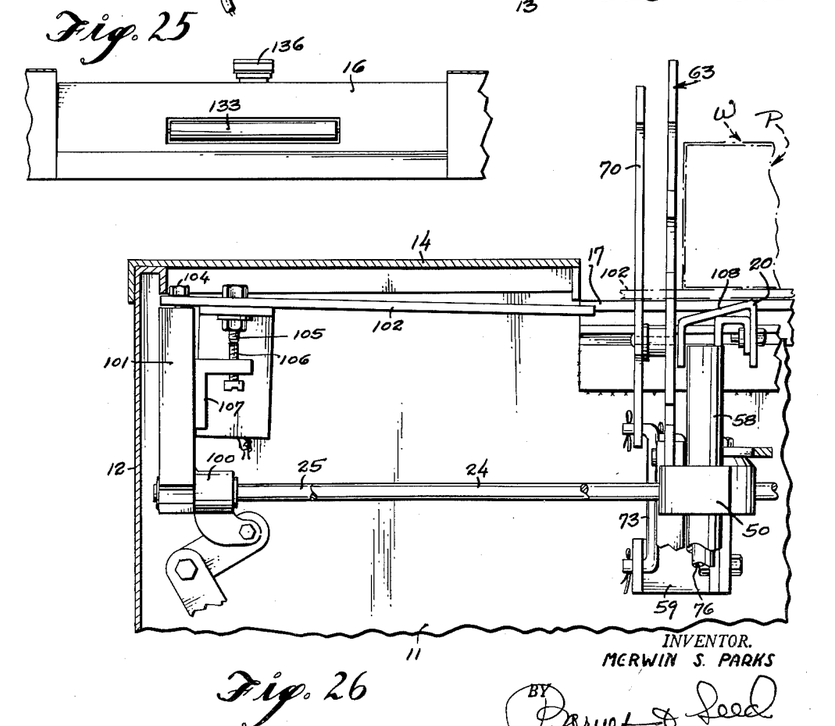
FIG. 25 is a reduced-scale fragmentary top plan view of the structure shown in FIG. 23.
FIG. 26 is a fragmentary enlarged-scale transverse vertical sectional view detailing the mountings for heater plates employed in the machine.

The ends of the two said frame bars 24 and 25 extend well beyond the two heads 50 and 51, and a respective carriage 100 is mounted for reciprocal sliding movement upon each pair of said ends. These carriages have posts 101 rising from each side edge to a height approximating the level of the tables 20 and 21. A respective heater plate, as 102 and 103, has its rear edge overlying the posts of a related said carriage, being loosely attached thereto by cap-screws 104. To the front of these cap-screws, bolts 105 are secured to the plate and bear upon a subjacent adjusting screw 106 threaded in a post-carried bracket 107. Screws 106 are set so as to have the heater plate slope downwardly in a moderate degree when the carriage occupies the normal retracted position in which it is shown in FIG. 26. The heater plates are adapted to move inwardly in unison, one in opposition to the other, in course of which each inner edge works up the inclined ramp 108 provided by the related table 20 or 21. At the inner limit of travel of the two heater plates reach substantially the position in which they are shown in FIG. 11, in course of such travel riding upon the top level of the tables after traversing the ramps. The significance of the loose mounting provided for the outer ends of the heater plates is to accommodate the front ends to the ramps. The heater plates are composed of aluminum or other suitable material of a high heat-conductive nature, being heated at the rear ends by electric resistance elements contained in an electric circuit closed by a manually operated switch 110.

Figures 3, 4:
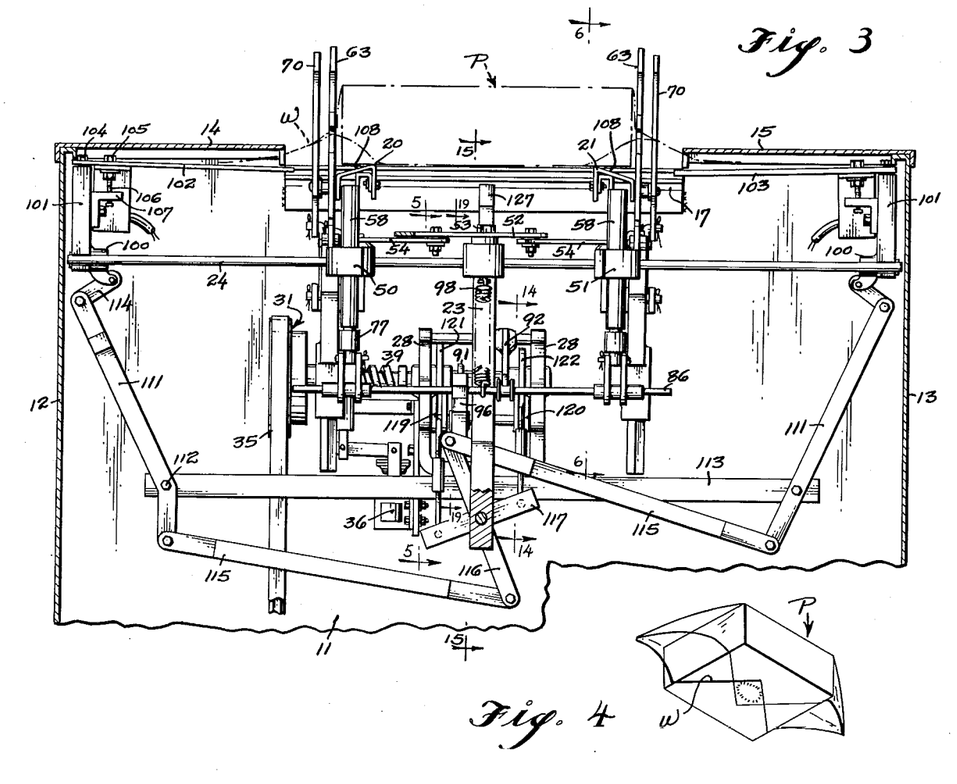
FIG. 3 is a transverse vertical sectional view on line 3—3 of FIG. 1.
FIG. 4 is a perspective view representing a package after a rectangular sheet of cellophane has been applied thereto with two opposite corners having been pulled under the package and tacked one to the other.
Figure 5:
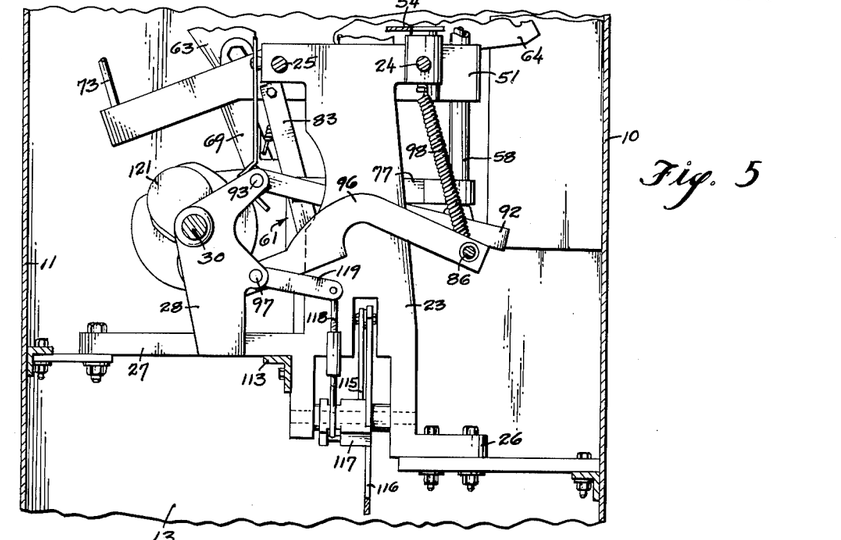
FIG. 5 is a fragmentary longitudinal vertical sectional view drawn to an enlarged scale on line 5—5 of FIG. 4.

Activation of the carriages 100 in their said reciprocal movement is afforded by respective levers 111 of the first order fulcrumed at 112 to an angle iron 113 bolted to the stand 23. One end of the lever connects by a link 114 to the related carriage. A pitman arm 115 powers the other end of the lever from a respective one of two arms 116 extending radially in opposite directions from a double-levered treadle 117 journaled in a downwardly facing fork of the stand 23 for rocker motion about a longitudinal horizontal axis. The double levers are formed as foot prolongations of the treadle so as to extend radially from diametrically opposite sides at substantial right angles to the arms 116, and each said foot of the treadle connects by a link 118 with a respective one of two cam-operated levers, as 119 and 120. These two levers operate about the pin 97 as a fulcrum, and are activated one by a cam 121 and the other by a cam 122. It will thus be seen that the cam 121 operates through lever 119 to advance the heater plates into the position shown in FIG. 11 and that the cam 122 operates through lever 110 to return the heater plates into the normal retracted position in which they are shown in FIGS. 3 and 26.

The remaining one of the five cams is denoted by 123 (see FIG. 15) and acts upon a kick-out lever 124 fulcrumed at 93 for reciprocal swing movement about a transverse horizontal axis. By action of a counterweight 126 the free end 127 of the lever 124 normally occupies a depressed position in the opening between the two tables 20 and 21. Upon engagement by the cam 123 said free end is swung upwardly and ejects from the tables a package which has been wrapped thereon. Return motion of the kick-out lever is cushioned by an elastic button 128.

The switch for the solenoid 36 is contained in a box 130 underlying the feed apron 16. The switch, as previously noted, is one which by its activation energizes the solenoid only momentarily, and for such activation there is provided a button 131 engaged by a nub 132 presented upon the periphery of a roller 133 journaled for rotation about a transverse horizontal axis. The roller is composed of rubber or other friction material, and a top portion thereof projects through a slot formed in the apron so as to be frictionally turned by the hand of a machine operator in course of withdrawing the hand after having fed to the machine a package which is to be wrapped. It will be seen that a stop 134 is provided limiting the degree to which the roller 133 may be turned in a direction converse to its switch-operating movement.

An electrically energized heating iron 136 is supported in a centered position between the two tables 50 and 51 at the extreme front end thereof, having as its function to tack two lapped tabs of the cellophane wrapping W, one to the other, by momentarily pressing the same upon the iron coincident with the act of feeding the package to the machine.

The wrapping sheet is of rectangular shape, moderately longer across the two diagonals than the girths of the package measured along planes which bisect the package in two opposite directions, and the procedure is one of initially so placing the package P upon a stack of the sheets that said diagonals coincide with the bisecting planes. Drawing two opposite ends of the top-most sheet up and around the package, said package is inverted and the above-described tacking step is performed, giving to the package and its wrapping sheet the appearance illustrated in FIG. 4. This is but the work of a moment and performed almost without interruption as a step incident to placing the partially wrapped package upon the tables 20 and 21, it being understood that the two heads 50 and 51 have been previously so adjusted that the space between the hook members which lie at one side of the tables and those which lie at the other side of the tables only moderately exceeds the width of the package. When so placed upon the tables the free ends of the wrapping sheet project laterally and are caught either in the lower or upper slots 65 or 67, respectively, of the hook members 63, depending upon the height of the package. As the hand of the operator is now withdrawn from the machine the same is passed over the roller 124 to turn the roller and cause solenoid 36 to be energized, responsively engaging the clutch which normally holds the cam shaft in an inactive condition. As the cam shaft responsively turns through one complete revolution, the following operations occur.

Figure 8:
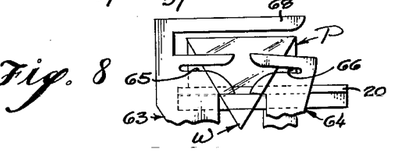

First, the cam 90 acts through lever 92 to depress the cross-rod 86. In its initial descent with such cross-rod, presser feet 77 act through the linking rods 78 to swing the two hook members 64 upwardly from the position shown in FIG. 6 into the position illustrated in FIG. 7. The free ends of the wrapping sheet thus are caught in the two slots 65 and 66, as can be seen from an inspection of FIG. 8.

Upon approaching the pins 81 in their descending travel the two foot members 77, one at one side and the other at the other side of the machine, will have disengaged the locking arms 83 from the yoke-piece 61, allowing said yoke-pieces to be depressed in unison with the presser feet through the remaining downward travel of the cross-bar. This depressive movement draws the hook members 63 and 64 into the position shown in FIGS. 9 and 10, the result of which is to pull downwardly upon the laterally projecting tabs of the wrapping sheet. This downward pull, in addition to placing the tabs in condition for a final sealing step, serves the advantageous end of stretching the wrapping sheet over the top of the package. Coincident with said downward pull action performed by the hook members, the descending motion moves the pivot center 71, whereupon the sweep arms 70 swing from the normal position shown in FIG. 7 into the depressed position shown in FIG. 9. To understand the function of the sweep arms it is pointed out that projecting tabs of the wrapping sheet may occasionally curl upwardly at the extreme end. The sweep arms remove this curl.

Figure 12:
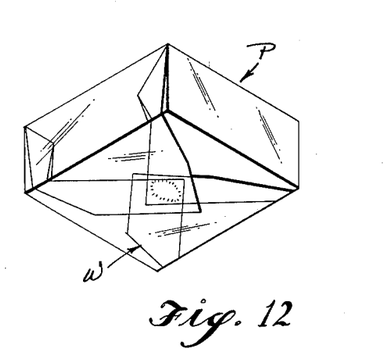
FIG. 12 is a underside perspective view of the fully-wrapped package, such being accomplished when the machine reaches said third stage of operation.
Figure 13:
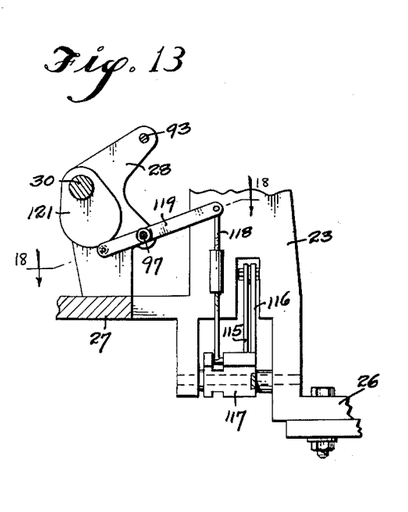
FIG. 13 is a fragmentary longitudinal vertical sectional view on line 13—13 of FIG. 11.

As the lever 92 substantially initiates its traverse of the high point of the cam 90, encompassing an approximate 270° arc, at which time the described steps will have been completed, the cam 122 acts upon lever 120 to rock the treadle 117 in a clockwise direction, as viewed from the front or operator's side of the machine. Working through the links and levers 116—115—111—114 the two carriages 100 now responsively move inwardly in unison, causing the leading edges of the heater plates 102 and 103 to engage the depending tabs of the wrapping sheet and push the same inwardly under the package. Said leading edges rise as they traverse the ramps, lifting the package as they work under the same. It will be understood that the tab ends of the wrapping sheet are looped over the leading edges of the plates as the latter advance and this perforce imposes considerable pull upon the sheet to stretch the same taut as the heater plates progress along the underside of the package. As the tabs are wiped along the underside by such progressive advance, the sealing heat imposed by the plates fuses the wiped ends to the cellophane wrapping which underlies the same and there is produced a package wrapped in the manner illustrated in FIG. 12. Cam 121 now comes into play to back off the heater plates by action of the lever 119, again working through the links and levers 116—115—111—114. Cam 91 also acts at this time through lever 96 to raise the cross-arm and responsively return the hook members and the sweep arms to their normal position, and cam 123 then kicks the arm 124 so that the wrapped package is delivered from the tables 20—21 onto the sloping discharge apron 17. This completes a cycle of operation of the machine, the rotation of the cam shaft being arrested as the radial pin 40 strikes the bias face 41 of the vertically movable pin 42 and disengages the clutch against the yielding thrust imposed by spring 39.

It is thought that the invention will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A machine for completing the wrapping of a partially wrapped object employing as the wrapper a generally rectangular sheet of heat-sealable material so centered in overlying relation upon the object that the two diagonals of the sheet approximately coincide with intersecting vertical planes one bisecting the object transversely and the other longitudinally, and having two opposite corners of the wrapper projecting as free flies while the other two opposite corners are heat-tacked one to the other after being brought down and under the object, said machine comprising a rest on which the partially wrapped object is supported with the free flies projecting laterally from opposite sides thereof, a respective member disposed at each of the two sides of said rest adapted to engage said free flies and mounted for vertical reciprocation from a normal elevated position into and out of a depressed position whereat said flies depend along the sides of the object, and a respective member disposed at each of the two sides of said rest adapted to engage said depending flies and mounted for horizontal reciprocation from a normal retracted position into and out of an advanced position whereat the ends of the engaged flies are brought inwardly into positions overlying the previously heat-tacked corners of the wrapper, means being provided for subjecting said flies to a heat sufficient to tack the same to the heat-tacked corners which they overlie.

2. A machine for completing the wrapping of a partially wrapped object employing as the wrapper a generally rectangular sheet of heat-sealable material so centered in overlying relation upon the object that the two diagonals of the sheet approximately coincide with intersecting vertical planes one bisecting the object transversely and the other longitudinally, and having two opposite corners of the wrapper sheet projecting as free flies while the other two opposite corners are heat-tacked one to the other after being brought down the ends and under the bottom of the object, said machine comprising a rest giving support to the partially wrapped object with the free flies projecting laterally from opposite sides thereof, a respective member disposed at each of the two sides of the rest adapted to engage said free flies of the supported object and mounted for vertical reciprocation from a normal elevated position into and out of a depressed position whereat said flies depend along the sides below the level occupied by the bottom of the object, a respective heater plate at each of the two sides of the rest mounted for reciprocation in a generally horizontal direction from a normal retracted outer position into and from an advanced inner position, in course of which inward movement the inner edge of each plate wipes the free end of a related one of said depending flies along the bottom face of the object onto the previously heat-tacked corners of the wrapper, means being provided for heating said inner edges of the heater plates to a temperature which will fuse said flies to the previously heat-tacked corners which they overlie, and power means for activating said members and said plates in their said reciprocatory motion.

3. A machine according to claim 2 having power-operated means for discharging the wrapped object from the rest.

4. A machine for completing the wrapping of a partially wrapped object employing as the wrapper a generally rectangular sheet of heat-sealable material so centered in overlying relation upon the object that the two diagonals of the sheet approximately coincide with intersecting vertical planes one bisecting the object transversely and the other longitudinally, and having two opposite corners of the wrapper sheet projecting as free flies while the other two opposite corners are heat-tacked one to the other after being brought down the ends and under the bottom of the object, said machine comprising a pair of longitudinally extending tables occupying transversely spaced positions at opposite sides of the longitudinal median line of the machine and acting one to support one side edge and the other to support the other side edge of the partially wrapped object with the free flies projecting laterally from opposite sides thereof, vertically movable members occupying positions to the outside of said tables and each presenting a horizontal finger arranged to overlie a respective one of the two laterally projecting flies, means for reciprocally moving said members from a normal elevated position into and out of a depressed position whereat the flies are pulled downwardly by the fingers along the sides of the supported object with the free ends projecting below the level occupied by the bottom of the object, a respective heater plate at each of the two sides of the supported object mounted for opposed reciprocatory motion approximately in said plane occupied by the bottom of the object and movable from a normal outer position retracted beyond the path travelled by the fingers into and from an inner advanced position whereat inner edges engage said projecting free ends of the flies and push the same inwardly so that the same are wiped along the bottom face of the object onto the previously heat-tacked corners of the wrapper, means being provided for heating said inner edges of the heater plates to a temperature which will fuse said flies to the previously heat-tacked corners which they overlie, and power means for activating said fingered members and said plates in their said reciprocatory motion.

5. Structure as recited in claim 4 having sweep members occupying positions to the immediate outside of the fingered members, movable reciprocally in a vertical direction and acting as a complement to the fingered members pushing free ends of the flies downwardly into positions whereat the same lie below the horizontal plane of travel of the heater plates.

6. Structure according to claim 4 having means for shifting the fingered members transversely so as to change the span therebetween and thus accommodate the machine to objects of different widths.

7. A machine according to claim 4 having a normally inactive swing-arm occupying a position between the tables and operating when activated to discharge the wrapped object from the machine.

8. A machine according to claim 4 in which the power means includes cams timed so that, successively, (1) the fingered members move in their downward stroke of reciprocation, (2) the heater plates move in their inward stroke of reciprocation, (3) the heater plates move in their return outward stroke of reciprocation, and (4) the fingered members move in their return upward stroke of reciprocation.

9. A machine according to claim 8 in which said cams are normally arrested, and having an electrically operated means for activating the cams through a single cycle of operation of the machine and included in a normally open electric circuit closed by a manually operated roller switch.

10. A machine according to claim 4 in which the heater plates are so mounted that the inner ends can rise freely within a prescribed narrow range of vertical movement, and wherein the tables each present a ramp surface facing toward the outside and over which said inner ends ride as the heater plates move in their inward stroke of reciprocatory travel.

11. In a machine having means giving support to an object on which free flies of a heat-sealable wrapping sheet project laterally in opposite directions from the top of the object, a respective finger at each of the two sides of the supported object mounted for reciprocatory vertical movement from a normal elevated position whereat the fingers each overlie a related one of the two laterally projecting flies into a lowered position whereat each finger engages and pulls the fly downwardly along a related side of the object and causing the free end to project below the horizontal plate occupied by the bottom face of the supported object, means at each of the two sides of the supported object mounted for opposed reciprocatory movement in the approximate horizontal plane occupied by said bottom face of the object from a normal outer position retracted beyond the path travelled by the fingers into and out of an inner advanced position whereat their inner ends engage said projecting free ends of the flies and wipe the same along the bottom face of the object, means being provided for subjecting said wiped flies to a fusing heat, and means for activating said fingers and said fly-wiping means in their said reciprocatory motion.

12. Structure according to claim 11 in which the fingers each are disposed horizontally at substantial right angles to a transverse median line common to the two files and move bodily in their reciprocatory vertical motion.

13. Structure as recited in claim 12 having respective sweep arms each occupying a position to the immediate outside of a related one of the two fingers, mounted for reciprocatory swing motion in a vertical plane closely paralleling the path travelled by the related finger, and acting as a complement to the fingers pushing free ends of the flies downwardly into positions whereas the same lie below the horizontal plane of travel of the fly-wiping means.

14. In a machine having means giving support to an object on which there is an overlying heat-sealable wrapping sheet from which fly sections having considerable length measured along the longitudinal median line project laterally from each of the two opposite sides, a respective heater plate at each of the two sides of the supported object mounted for opposed reciprocatory movement in the approximate horizontal plane of said support means from a normal outer position retracted well beyond a related side limit of the supported object into and from an advanced position whereat the inner end of one plate approximately touches the inner end of the other plate, a respective finger at each of the two sides of the supported object disposed horizontally at substantial right angles to said longitudinal median line of the flies and mounted for reciprocatory vertical movement bodily from a normal elevated position whereat the fingers each overlie a related one of the two laterally projecting flies into and from a lowered position whereat the finger lies below the horizontal path travelled by the heater plates, a set of cams carried by a common power-driven cam shaft and operatively interconnected with the heater plates and with the fingers so that the heater plates move inwardly in concert by action of a first said cam and move outwardly in concert by action of a second said cam, and the fingers move downwardly in concert by action of a third said cam and move upwardly in concert by action of a fourth said cam, said cams being so timed that in each cycle of operation of the machine the third, first, second and fourth cams, respectively, are brought successively into play so that the fingers initially pull the flies downwardly bringing the free ends thereof across the horizontal path in which the heater plates travel and remain in such lowered position during the interval necessary for the plates to complete their inward and outward movement, the inner ends of said plates wiping the free ends of the flies along the bottom of the supported object as the plates move inwardly, and means for heating said inner ends of the heater plates to a temperature which will fuse the wiped free ends of the flies.

15. Structure according to claim 14 in which the inner ends of the heater plates normally occupy a horizontal plane spaced moderately below the plane occupied by the bottom of the supported object and are so mounted that said inner ends can rise freely, and wherein means are provided operative upon said heater plates as the same move inwardly acting to lift said inner ends to a level above that of the support means and thus transferring the direct load of the object from the support means to said inner ends of the heater plates.

16. A machine as recited in claim 14 having a fifth cam also carried by said cam shaft and operating through a swingably mounted arm to eject the object from the machine when the described wrapping steps have been completed.

17. The machine recited in claim 14 characterized in that the cam shaft is normally arrested, and having means set into operation by the closing of a manually operated electric switch for powering the cam shaft and then inactivating the same upon the completion of a single revolution.

18. A machine according to claim 17 in which the object with its wrapping sheet is placed by hand upon the support means, and wherein the switch is a roller switch occupying a position in the path travelled by an operator's hand in the act of placing the object on the support means and then withdrawing the hand from the machine, said roller switch being activated so as to close the concerned electric circuit only when rotated in the direction caused by brushing of the hand over the same when the hand is being withdrawn from the machine.

19. In a wrapping machine, a wrapping station, a rest located at said station giving support to an object on which there is an overlying heat-sealable wrapping sheet from which fly sections having considerable length measured along the longitudinal median line project laterally from each of the two opposite sides, and respective means mounted at each side of said rest movable by power relative thereto for sequentially bringing said projecting flies downwardly along a related side face of the supported object, wiping free ends thereof inwardly along the bottom face of the object, and heating said wiped free ends of the flies so that the same will adhere by fusion, the means which brings the flies downwardly and which wipes the free ends of said flies inwardly being independent of one another, said means acting to lift the object off the rest and wholly sustain the weight thereof during the act of wiping the free ends inwardly along the bottom face of the object and thus causing the flies to be automatically subjected to a tensioning stretch force drawing the wrapping sheet tight about the object.

20. In a machine having means giving support to an object on which free flies of a heat-sealable wrapping sheet project laterally in opposite directions from the top of the object, a respective vertically movable member disposed at each of two opposite sides of the supported object adapted to engage said free flies and bring the same downwardly so that the flies lie alongside a respective side face of the supported object with their ends projecting below the horizontal plane occupied by the bottom face of the supported object, a respective horizontally movable heater element disposed at each of the two sides of the supported object adapted to engage said downwardly projecting ends of the flies and wipe the same along the bottom face of the object, means for bringing said heater elements to a temperature condition which will heat-tack the wiped flies, and means acting as the heater elements perform said operation of engaging and wiping the fly ends causing relative vertical motion as between the heater elements and the support means from a first condition whereat the support means occupies a level about that of the heater elements to a second condition whereat the heater elements occupy a higher level, thus transferring the direct load of the object from the support means to the heater elements.

References Cited in the file of this patent

UNITED STATES PATENTS

| 1,637,802 | Bronander | Aug. 2, 1927 |
| 2,050,268 | Bronander | Aug. 11, 1936 |
| 2,917,885 | Stremke | Dec. 22, 1959 |

FOREIGN PATENTS

| 537,281 | France | May 19, 1922 |